United States Patent
Zeller et al.

(10) Patent No.: US 9,631,502 B2
(45) Date of Patent: Apr. 25, 2017

(54) BLADE CONNECTION OF A ROTOR BLADE OF A WIND TURBINE

(75) Inventors: Lenz Simon Zeller, Kiel (DE); Markus Werner, Kiel (DE)

(73) Assignee: Senvion SE, Hamburg (DE)

( * ) Notice: Subject to any disclaimer, the term of this patent is extended or adjusted under 35 U.S.C. 154(b) by 821 days.

(21) Appl. No.: 13/823,799

(22) PCT Filed: Sep. 5, 2011

(86) PCT No.: PCT/EP2011/004459
§ 371 (c)(1),
(2), (4) Date: Mar. 15, 2013

(87) PCT Pub. No.: WO2012/038034
PCT Pub. Date: Mar. 29, 2012

(65) Prior Publication Data
US 2013/0177428 A1    Jul. 11, 2013

(30) Foreign Application Priority Data

Sep. 24, 2010 (DE) .................... 20 2010 013 535 U

(51) Int. Cl.
*F01D 5/30* (2006.01)
*F03D 1/06* (2006.01)
*F03D 80/30* (2016.01)

(52) U.S. Cl.
CPC ............. *F01D 5/30* (2013.01); *F03D 1/0658* (2013.01); *F03D 80/30* (2016.05); *Y02E 10/721* (2013.01)

(58) Field of Classification Search
CPC ............. F01D 5/30; F03D 11/04; B23P 17/00
See application file for complete search history.

(56) References Cited

U.S. PATENT DOCUMENTS

| 4,420,354 A | 12/1983 | Gougeon et al. | |
| 4,920,449 A * | 4/1990 | Covey ....................... | H05F 3/02 244/1 A |
| 6,371,730 B1 * | 4/2002 | Wobben ................ | F03D 1/0658 416/204 R |

(Continued)

FOREIGN PATENT DOCUMENTS

| DE | 29618525 | 6/1997 |
| DE | 102004010104 | 9/2005 |

(Continued)

*Primary Examiner* — Jesse Bogue
*Assistant Examiner* — Shafiq Mian
(74) *Attorney, Agent, or Firm* — Rankin, Hill & Clark LLP

(57) ABSTRACT

A fastening element (12) for arrangement in a receptacle of a rotor blade connection (17) of a rotor blade (5). The receptacle is formed on the rotor hub-side end of the, preferably flange-free, rotor blade (5). The fastening element (12) is arranged in the receptacle between an inner fastening side and an outer fastening side of the rotor blade (5) and the fastening element (12) introduced into the receptacle (10) is connected to the inner fastening side and the outer fastening side of the rotor blade (5). The fastening element (12) is formed tapered in the longitudinal extension thereof. The fastening element (12) has a connector (15) transverse, particularly perpendicular, to the longitudinal extension for a lightning protection conductor (18) of the rotor blade (5).

14 Claims, 2 Drawing Sheets

(56) References Cited

U.S. PATENT DOCUMENTS

| | | | |
|---|---|---|---|
| 6,537,031 B1* | 3/2003 | Bacskay | B63H 1/20 416/207 |
| 7,530,168 B2* | 5/2009 | Sorensen | B29C 70/86 29/889.21 |
| 8,133,029 B2* | 3/2012 | Quell | F03D 1/0658 416/204 R |
| 2006/0051207 A1* | 3/2006 | Becerra | F03D 1/065 416/5 |
| 2006/0126252 A1* | 6/2006 | Mortensen | G01W 1/16 361/118 |
| 2008/0206059 A1* | 8/2008 | Hancock | F03D 1/0658 416/213 R |
| 2009/0263250 A1* | 10/2009 | Quell | F03D 1/0658 416/204 R |
| 2010/0090472 A1* | 4/2010 | Berthelsen | F03D 80/30 290/55 |
| 2011/0044817 A1* | 2/2011 | Bendel | F03D 1/0658 416/204 R |
| 2013/0115073 A1* | 5/2013 | Thiel | F03D 80/30 415/208.1 |
| 2013/0195661 A1* | 8/2013 | Lind | F03D 80/40 416/95 |

FOREIGN PATENT DOCUMENTS

| | | |
|---|---|---|
| DE | 102005017865 | 11/2006 |
| DE | 102008021498 | 11/2009 |
| DE | 102008045939 | 3/2010 |
| EP | 0057272 | 8/1982 |
| EP | 1486415 | 12/2004 |
| WO | 01/42647 | 6/2001 |
| WO | 2007/131589 | 11/2007 |

\* cited by examiner

BLADE CONNECTION OF A ROTOR BLADE OF A WIND TURBINE

BACKGROUND OF THE INVENTION

Field of the Invention

The invention relates to a fastening element for arrangement in a receptacle of a rotor blade connection of a rotor blade, wherein the receptacle is formed on the rotor hub-side end of the, preferably flange-free, rotor blade. The fastening element is or will be arranged in the receptacle between an inner fastening side and an outer fastening side of the rotor blade and the fastening element is or will be connected to the inner fastening side and the outer fastening side of the rotor blade. The fastening element is formed tapered in the longitudinal extension thereof. The invention further relates to a rotor blade connection of a wind turbine for connecting a rotor blade to a rotor hub.

Description of Related Art

Rotor blade connections for connecting a rotor blade to a connector apparatus are known for example from WO 01/42647 A2 and WO 2007/131589 A2.

In addition, DE 296 18 525 U1 describes a blade flange for a rotor blade of wind turbines.

Furthermore, it is known that with erected wind turbines there is a significant risk of lightning strikes due to the exposed position of the wind turbine. With lightning strikes at a wind turbine, the rotor blades are most at risk, wherein in the event of a lightning strike the electrical energy of a lightning is conducted from the rotor blades via the rotor hub, a nacelle and a tower of the wind turbine into the ground. For conducting the lightning energy, transition devices are required which permit the rotor to rotate and simultaneously guarantee the transfer of the electrical energy of a lightning.

For example, a lightning protection device for wind turbines is known from DE 10 2004 010 104 A1, wherein the wind turbine is provided for conducting electrical energy of a lightning strike via a lightning conductor system to the ground on which a tower of a wind turbine is fastened.

In addition, DE 10 2005 017 865 B4 describes a wind turbine having a lightning conductor device.

BRIEF SUMMARY OF THE INVENTION

Starting from this prior art, the object of the invention is, at a rotor blade connection of a rotor blade, which is preferably free of metal flanges, in the event of a lightning strike at a wind turbine, to transmit the energy of the lightning in a simple manner from a rotor blade, and to conduct the energy via the rotor hub, the nacelle, and the tower of the wind turbine to the ground.

The object is solved by a fastening element for arrangement in a receptacle of a rotor blade connection of a rotor blade, wherein the receptacle is formed on the rotor hub-side end of the, preferably flange-free, rotor blade. The fastening element is or will be arranged in the receptacle between an inner fastening side and an outer fastening side of the rotor blade and the fastening element introduced into the receptacle is or will be connected to the inner fastening side and the outer fastening side of the rotor blade. The fastening element is formed tapered in the longitudinal extension thereof, which fastening element is further developed in that the fastening element has a connector transverse, particularly perpendicular, to the longitudinal extension for a lightning protection conductor of the rotor blade.

According to the invention it is provided with a rotor blade, which does not have a steel flange for fastening to a rotor hub, to transmit the lightning energy via a lightning protection cable in the rotor blade through a connection to a fastening element at the rotor blade connection, wherein the fastening element connected to the lightning protection cable is connected to a rotor blade bearing for discharging electrical energy of a lightning strike to the ground.

Here, the wind turbine has a tower for fastening to the ground, wherein a nacelle is arranged on the tower, on which nacelle a rotor with a rotor hub and rotor blades connected in a rotational manner to the rotor hub is arranged. The rotor, which consists of the rotor hub and the rotor blades arranged thereon, drives a generator arranged in the nacelle. A nacelle is understood, in particular, to be a housing, in which components of the wind turbine arranged on the tower are housed. Here typically, a generator and a gearbox, a drive shaft and a control device as well as support devices for the named components are arranged in the nacelle.

The flange-free rotor blade connection of a rotor blade, that is, formed without a (connection) flange, preferably has equidistantly arranged fastening elements for fastening the rotor blade connection to the rotor hub, wherein the fastening elements are arranged in a ring shape at the end of the rotor blade. Here, the fastening elements, formed fragmented or integrally, are arranged in a receptacle on the rotor hub-side of the rotor blade connection, wherein the fastening elements are connected, preferably bonded, at the connector side to the rotor blade.

The rotor blade connection having the receptacle for the fastening element is formed in particular arc-shaped as a closed circle or a segment thereof.

In the scope of the invention it is provided that the fastening element is formed having a complementary shape to the receptacle on the rotor hub-side of the rotor blade.

According to the invention it is provided that using the connector that is separate from the fastening element, for example in the shape of an elevation formed as a connector element, the lightning protection cable of the rotor blade, or respectively the lightning protection conductor of the rotor blade is electrically conductive connected to the fastening element.

In addition, in a further development it is provided that the connector for the lightning protection conductor of the rotor blade is or will be arranged on the inside of the rotor blade.

For this purpose, it is preferably further provided that the fastening element at the head-side thereof facing the inside of the rotor blade has a recess, particularly a borehole, for receiving a connector piece projecting from the head-side of the fastening element, wherein the connector piece is or will be connected to the end of the lightning protection conductor.

Additionally, it is preferred that the fastening element and the connector for the lightning protection conductor of the rotor blade are electrically conducting and/or composed of metal, preferably steel. Hereby, a low resistance connection is formed for conducting the electrical energy of a lightning strike to the ground, wherein the lightning conductor leads from the rotor blades via the rotor hub, the nacelle to the tower to the ground of the tower.

In addition, it is favorable if the connector forms an electrically conducting connection between the lightning protection conductor arranged in the interior of the rotor blade and the fastening element that is insulated with respect to the lightning protection conductor. Here, the fastening element is arranged for example between an inner layer and an outer layer of a connection material of the rotor blade connection at the rotor hub-side end of the rotor blade. Here, the connection material is preferably composed of a glass fiber material (e.g., GRP), which is soaked with resin and is connected to other elements. Thereby, the fastening element is arranged between the inner layer and the outer layer, in which a receptacle is formed for the fastening element at the rotor blade connection.

The connector and fastening element are or will be preferably detachably connected.

For this purpose, in a further design it is provided that the fastening element in the receptacle of the rotor blade at the rotor blade connection will be bonded or is connected to the rotor blade or to the rotor blade connection.

Additionally, a preferred design of the fastening element is distinguished in that the fastening element is or will be inserted into a ring-shaped receptacle of the rotor blade connection, wherein in particular several fastening elements are arranged equidistantly in a ring shape at the rotor blade connection, and wherein in particular in each case a distancing element is or will be arranged between two fastening elements. The fastening elements are spaced from each other using the distancing elements, arranged in a ring shape in the receptacle or the receptacle space of the rotor blade connection.

For this purpose, it is further provided that the fastening element at the rotor hub-side end thereof has a substantially quadrangular, preferably rectangular or square, cross-section in the connection plane of the rotor hub. In the longitudinal extension, the fastening element is formed having a preferably trapezoidal cross-section, wherein the fastening element in the longitudinal extension thereof has a radially inward tapering side towards the arc-shaped receptacle, at which side the connector for the lightning protection cable or the lightning protection conductor of the rotor blade is or will be arranged.

In addition, it is provided in the scope of the invention that the fastening elements and the distancing elements arranged in the arc-shaped or ring-shaped receptacle of the rotor blade connection are connected together, preferably by laminating.

Furthermore it is provided that for connecting to the rotor hub, the fastening element has a bolt hole, preferably with an internal screw thread, in order to receive connecting elements, or respectively connecting bolts, with connections of the rotor blade to the rotor hub, whereby the rotor blade is connected to the rotor hub.

Additionally, in one design the fastening element is characterized in that the fastening element in the longitudinal extension has a borehole for receiving a bolt on the side, preferably square, facing the rotor hub.

Moreover it is preferred, if a ring, particularly a lightning protection ring, is or will be arranged on the side of the fastening element(s) facing the rotor hub, whereby an electrical connection is formed between the lightning protection cable or the lightning protection conductor of the rotor blade and the rotor hub via the connector at the fastening element, and the fastening element and the lightning protection ring.

In addition, the object is solved by a rotor blade connection of a wind turbine for connecting a rotor blade to a rotor hub using at least one fastening element, wherein the fastening element is formed as described above.

Furthermore, the object is solved by a use of a fastening element, as described above, for arrangement in a receptacle of a rotor blade connection of a rotor blade. To avoid repetition, explicit reference is made to the previous exposition.

Further characteristics of the invention will become apparent from the description of the embodiments according to the invention, together with the claims and the included drawings. Embodiments according to the invention can fulfill individual characteristics or a combination of several characteristics.

BRIEF DESCRIPTION OF THE DRAWINGS

The invention is described below, without restricting the general idea of the invention, using exemplary embodiments with reference to the drawings, whereby we expressly refer to the drawings with regard to the disclosure of all details according to the invention that are not explained in greater detail in the text. In the figures.

In the following figures, the same or similar types of elements or corresponding parts are provided with the same reference numbers so that a corresponding re-introduction can be omitted.

DETAILED DESCRIPTION OF THE INVENTION

Figure 1:
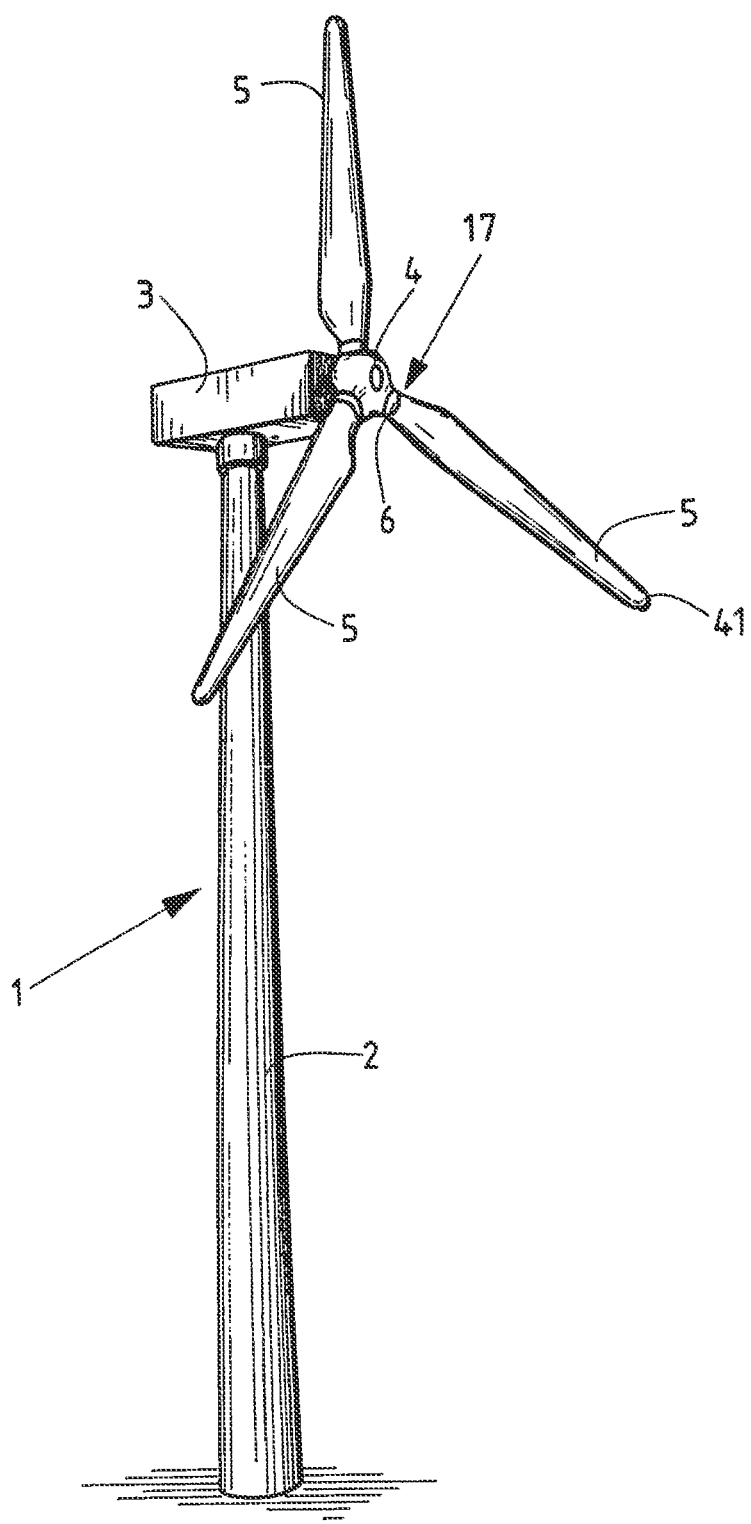
FIG. 1 is a perspective view a wind turbine according to the prior art.

FIG. 1 shows a schematic three-dimensional representation of a wind turbine 1 according to the prior art. The wind turbine 1 comprises a tower 2, erected on a ground, upon which a tower head 3 is attached that typically has a generator, not shown. In addition, a rotor hub 4 is shown to which rotor blades 5 are connected at the rotor blade root 6 to the rotor hub 4. Each rotor blade 5 has a rotor blade connection 17 and a rotor blade tip 41.

The rotor hub 4 can be connected to the generator by threaded connections, not shown here, using a flange and a generator shaft.

The rotor blades 5, preferably formed without a flange, are connected at the rotor blade roots 6 to the rotor hub 4. Screws are provided for the connection, wherein appropriate holes, or respectively boreholes, are provided in the respective material in order to allow a connection. Corresponding openings are provided in the rotor hub 4 for tightening the nuts. By tightening the nuts a pretensioning is generated.

Figure 2A:
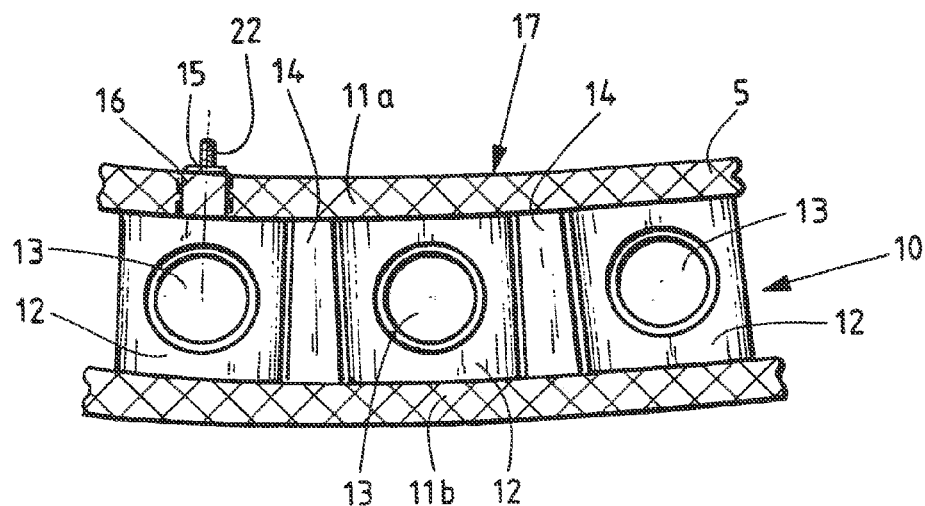
FIG. 2a is an elevation section view of a part of a rotor blade connection.
Figure 2B:
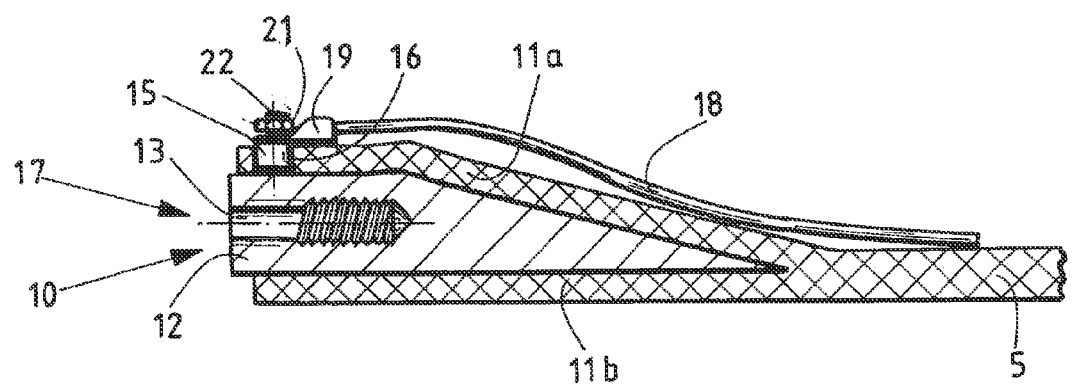
FIG. 2b is an elevation section view through a fastening element according to the invention in the region of a rotor blade connection.

FIG. 2a schematically shows a view of the rotor blade connection 17 of the rotor blade 5 in a sectional side view. FIG. 2b schematically shows a cross-section through the rotor blade connection 17.

The rotor blade connection 17 is part of the rotor blade 5. The rotor blade 5 is produced from a reinforced material, particularly glass fiber material, in a manner known per se, wherein a receptacle region 10 is formed at the rotor hub-side end of the rotor blade connection 17, wherein the rotor blade 5 has two legs 11a, 11b (in the cross-section, see FIG. 2b) as a rotor blade connection 17, wherein the legs 11a, 11b of the rotor blade connection 17 are produced from the same material, particularly glass fiber material (GRP), as is the rotor blade 5. Due to the branching of the legs 11a, 11b, the ring-shaped or circular receptacle space 10 is formed as a receptacle for fastening elements 12 to be inserted between the legs 11a, 11b.

Several fastening elements 12 are arranged next to each other in the ring-shaped receptacle space 10. The fastening elements 12 in the front view shown (see FIG. 2a) are formed square or block-like. The fastening elements 12 have a borehole 13 having an internal thread for inserting, or respectively screwing in, a bolt or a fastening screw.

A distancing element 14 is arranged in each case between two fastening elements 12 in the peripheral direction of the rotor blade connection 17, formed ring-shaped, wherein the distancing elements 14 and the fastening elements 12 are connected together at the adjacent sides. Resin, for example, is introduced in between the fastening elements 12 and the distancing elements 14 such that after hardening of the resin, the fastening element 12 and the distancing element 14 are connected together.

The receptacle space 10, or respectively the receptacles, for the fastening elements 12 and the distancing elements 14 are formed trapezoidal in cross-section in the longitudinal extension of the rotor blade 5 (see FIG. 2b), wherein in the receptacle space 10 fastening elements 12 complementary in shape are received or inserted into the receptacle space 10.

The inner leg 11a formed toward the inside of the rotor blade 5 forms the inner fastening side of the rotor blade 5, and the outer leg 11b forms the outer fastening side of the rotor blade 5, wherein the fastening element(s) 12 introduced into the receptacle space 10 are or will be connected together with the contact surfaces of the receptacle space 10 by bonding, for example by applying resin or introducing resin between the contact surfaces of the fastening elements 12.

Figure 2C:
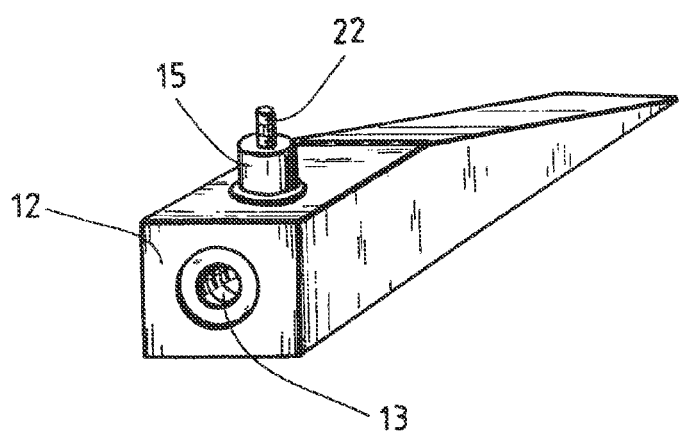
FIG. 2c is a perspective view of a fastening element.

In addition, it can be seen in FIG. 2b and also in the perspective representation in FIG. 2c, that the fastening element 12 is formed tapering in the longitudinal extension thereof at the tip. At the head side facing toward the interior of the rotor blade 5, the fastening element 12 is formed with a connector element 15 projecting out of the head side of the fastening element 12 which is inserted in a through hole in the inner leg 11a.

The connector element 15, as well as the fastening element 12, are produced from metal, preferably steel, such that the connector element 15 and the fastening element 12 are electrically conducting.

For receiving the connector element 15, a through hole, or a hole 16 (see FIG. 2a) is formed at the inner leg 11a, into which the connector element 15 is inserted, after the fastening element 12 was arranged in the receptacle space 10 between the legs 11a and 11b. Next, the connector element 15 is connected from the inside of the rotor blade 5, for example by screwing into a borehole (not shown here) formed at the head side of the fastening element 12.

The rotor blade 5 further has a lightning protection device, wherein the lightning protection device has a lightning protection cable 18 in the interior of the rotor blade 5, in order to conduct the electrical energy of the lightning to the ground in the event of a lightning strike in the rotor blade 5. For this purpose, a connection piece 19, for example in the form of a cable lug or the like, is arranged at the end of the lightning protection conductor cable 18 and is placed on the connector element 15, wherein the connector element 15 has a screw element 22 such that after arranging the connection piece 19 on the connector element 15, the connection piece 19 is connected to the connector element 15 by tightening a screw nut 21.

With connecting the rotor blade 5 to the rotor hub, an electrically conducting ring is arranged in the region of the fastening element 12 at the contact-side of the rotor blade connection 17, wherein the flange-like electrically conducting ring is formed for example from metal as a lightning protection ring. Due to the arrangement of the rings, provided with boreholes, on the fastening element 12 it is possible to connect the rotor blade 5 to the rotor hub by introducing bolts into the boreholes 13 of the fastening element 12.

All named characteristics, including those to be taken from the drawings alone, and individual characteristics, which are disclosed in combination with other characteristics, are considered individually and in combination as essential to the invention. Embodiments according to the invention can be fulfilled through individual characteristics or a combination of several characteristics.

LIST OF REFERENCE NUMBERS 1 wind turbine
2 tower
3 tower head
4 rotor hub
5 rotor blade
6 blade root
10 receptacle region
11a, 11b leg
12 fastening element
13 borehole
14 distancing element
15 connector element
16 borehole
17 rotor blade connection
18 lightning protection cable
19 connection piece
21 screw nut
22 screw element
41 rotor blade tip

The invention claimed is:
1. A rotor blade of a wind turbine, the rotor blade comprising:
   a rotor blade connection (17) including a receptacle with an inner leg (11a) forming an inner fastening side and an outer leg (11b) forming an outer fastening side, wherein the inner leg (11a) defines a through hole (16) and the receptacle is formed on a rotor hub-side end of the rotor blade (5);
   a lightning protection conductor (18) arranged on the inner fastening side of the rotor blade (5), and
   a fastening element (12) arranged in the receptacle between the inner fastening side and the outer fastening side of the rotor blade (5), where the fastening element (12) is connected to the inner fastening side and the out fastening side of the rotor blade (5), wherein the fastening element (12) includes a head side that faces an inside of the rotor blade (5),
   wherein the fastening element (12) extends in a tapering manner such that the fastening element (12) decreases in size when extending away from the rotor hub-side end of the rotor blade (5), wherein the outer leg (11b) extends away from the rotor hub side end of the rotor blade (5) so as to define a longitudinal direction thereof,
   wherein the fastening element (12) has a connector (15), the connector (15) is transverse to the longitudinal direction and is connected to an end of the lightning protection conductor (18) of the rotor blade (5),
   wherein the connector (15) is arranged at an inside of the rotor blade (5) and projects out of the head side of the fastening element (12),
   wherein the connector (15) is inserted in the through hole (16) of the inner leg (11a);

wherein the fastening element (12) has a recess for receiving the connector (15) projecting out of the head side of the fastening element (12).

2. The rotor blade according to claim 1, wherein the fastening element (12) and the connector (15) are electrically conductive.

3. The rotor blade according to claim 1, wherein the connector (15) forms an electrically conductive connection between the lightning protection conductor (18) that is arranged on the inner fastening side of the rotor blade (5) and the fastening element (12) that is insulated with respect to the lightning protection conductor (18).

4. The rotor blade according to claim 1, wherein the connector (15) and the fastening element (12) are detachably connected together.

5. The rotor blade according to claim 1, wherein the fastening element (12) is bonded to the rotor blade (5) in the receptacle (10) of the rotor blade (5).

6. The rotor blade according to claim 1,
wherein the receptacle (10) is ring-shaped,
wherein the fastening element (12) is inserted in the ring-shaped receptacle (10) of the rotor blade connection (17),
wherein several of the fastening elements (12) are arranged equidistantly in a ring-shape at the rotor blade connection (17),
and wherein a distancing element is arranged between two of the fastening elements (12).

7. The rotor blade according to claim 1, wherein the fastening element (12) in the longitudinal direction has a borehole for the receptacle (10) of a bolt on a side, facing the rotor blade.

8. The rotor blade according to claim 1, wherein a ring is arranged on a side of the fastening element (12) facing the rotor hub.

9. The rotor blade according to claim 8, wherein the ring is a lightning protection ring.

10. The rotor blade according to claim 1, wherein the fastening element (12) and the connector (15) are composed of metal.

11. The rotor blade according to claim 10, wherein the fastening element (12) and the connector (15) are composed of steel.

12. The rotor blade according to claim 1, wherein the recess is a borehole.

13. The rotor blade according to claim 1, wherein the rotor blade (5) is flange-free.

14. The rotor blade according to claim 1, wherein the fastening element (12) defines a borehole that is perpendicular to the connector (15).

* * * * *

UNITED STATES PATENT AND TRADEMARK OFFICE
CERTIFICATE OF CORRECTION

| | | |
|---|---|---|
| PATENT NO. | : 9,631,502 B2 | Page 1 of 1 |
| APPLICATION NO. | : 13/823799 | |
| DATED | : April 25, 2017 | |
| INVENTOR(S) | : Lenz Simon Zeller et al. | |

It is certified that error appears in the above-identified patent and that said Letters Patent is hereby corrected as shown below:

In the Claims

In Column 6, Line 49, Change "out" to --outer--

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*